United States Patent [19]

Seidel et al.

[11] Patent Number: 5,210,769

[45] Date of Patent: May 11, 1993

[54] LIQUID LEVEL MEASURING SYSTEM

[75] Inventors: William W. Seidel, Fond du Lac; Lance C. Tagliapietra, Eden, both of Wis.

[73] Assignee: The Great American Company, Fond du Lac, Wis.

[21] Appl. No.: 814,554

[22] Filed: Dec. 30, 1991

[51] Int. Cl.⁵ .............................................. G01F 23/24
[52] U.S. Cl. .................................. 73/295; 73/304 R; 340/450; 340/620
[58] Field of Search ............. 73/295, 304 R; 340/450, 340/450.1, 450.2, 450.3, 618, 620, 622

[56] References Cited

U.S. PATENT DOCUMENTS

| | | | |
|---|---|---|---|
| 3,111,031 | 11/1963 | Kuritza | 73/295 |
| 3,728,704 | 4/1973 | Moore | 340/450.3 |
| 4,053,874 | 10/1977 | Glover | 73/295 |
| 4,322,713 | 3/1982 | Duck et al. | 340/450.3 |
| 4,513,616 | 4/1985 | Bezard et al. | 73/295 |
| 4,564,834 | 1/1986 | Steele | 340/622 |
| 4,596,141 | 6/1986 | Kondo | 73/295 |
| 4,679,432 | 7/1987 | Draeger | 73/295 |
| 4,751,845 | 6/1988 | Peterson et al. | 73/295 |
| 4,845,469 | 7/1989 | Benda | 73/295 |
| 4,912,646 | 3/1990 | Cerruti | 73/304 R |
| 4,988,975 | 1/1991 | Nap | 340/622 |

Primary Examiner—William A. Cuchlinski, Jr.
Assistant Examiner—G. Bradley Bennett

[57] ABSTRACT

A liquid level measuring and indicating system using a positive temperature coefficient wire as a sensor, a microprocessor based operating circuit, and an electronically controlled display device. With energy to operate the system being supplied by a battery, circuit includes energy conservation provisions.

36 Claims, 16 Drawing Sheets

LIQUID LEVEL MEASURING SYSTEM

BACKGROUND OF THE INVENTION

1. Field of the Invention

This invention relates to an improved system including a probe, electronic circuit, and display panel for measuring and displaying the level of a liquid in a container.

2. Description of Related Art Including Information Disclosed under Secs. 1.97-1.99

Motor vehicles have long been provided with dip sticks for measuring the level of the oil in the engine oil pan and in the automatic transmission housing. Indicators, such as lights on the instrument panel have also been provided to warn the operator of low liquid levels. Measuring fluid levels with a dip stick, being a time consuming task, is often not regularly performed by the operator. While so called full service fuel stations do check fluid levels, with the hope of selling the needed fluid, self-service station do not offer that service. The result is that many operators do not regularly check fluid levels.

Attempts made in the past to provide means for measuring the levels of the several liquids used in motor vehicles are represented by the following United States Patents:

| U.S. Pat. No. | INVENTOR | ISSUE DATE |
| --- | --- | --- |
| 3,132,331 | Boddy | 5/5/64 |
| 3,626,367 | Howard et al | 12/7/71 |
| 3,728,704 | Moore | 4/17/73 |
| 4,110,740 | Akita et al | 8/29/78 |
| 4,322,713 | Duck et al | 3/30/82 |
| 4,503,419 | Kidd et al | 3/5/85 |
| 4,506,258 | Charboneau et al | 3/19/85 |
| 4,751,845 | Peterson et al | 6/21/88 |
| 4,910,495 | Sullivan | 3/20/90 |
| 4,912,646 | Cerruti | 3/27/90 |
| 4,952,914 | Mueller | 8/28/90 |

One type of system used to measure the level of fluids utilizes a float, which is buoyant in the fluid being measured, to provide an input to an electronic circuit. The patents to Moore, Sullivan and Cerruti reveal systems of this type. Another approach is to use the conductivity of the fluid to complete an electrical circuit. Devices utilizing this approach are shown in the Akita et al, Duck et al, Peterson et al and Mueller patents. Still another approach is represented by the Boddy patent which involves the measurement of fluid pressure. The Duck et al patent sets forth an extensive list of patents directed to fluid level measurement systems. The Howard et al and Kidd et al patents do not reveal the type of sensors used to measure fluid levels, but do reveal electronic circuits for fluid level measuring systems.

The Charboneau et al patent reveals a system for actuating a warning device for indicating a low level of a liquid in a receptacle, such as the oil pan of the engine. The sensing element as disclosed in the Charboneau et al patent includes several convolutions of a positive temperature coefficient wire which are submerged in the fluid unless the fluid drops below a predetermined low level. The circuit set forth in the Charboneau et al patent activates a warning device when the fluid reaches the predetermined low fluid level. The sensor described in the Charboneau et al patent is of a rather complex construction, and the electronic circuit used therewith does not reveal a method for providing an indication of the fluid level, other than that it is below a preselected lower level. Thus, the provision of a sensor employing a positive temperature coefficient material of simpler construction and of a circuit which will provide on demand an indication of the current fluid level is desirable.

SUMMARY OF THE INVENTION

Accordingly, it is an object of this invention to provide a liquid level measuring system which is capable of providing "On Demand" incremental indications of the level of a liquid in a container. Further, it is desirable to provide a liquid level sensing probe which is of simplified construction and readily adaptable for use in various applications. Applications of particular concern are those relating to the levels of liquids used in motor vehicles, such as motor oil, cooling liquid, transmission fluid, window washer solvent and others. It is a further object of the invention to provide an electronic circuit of simplified construction which will supply energy from a power source to both a probe and a read out device, and which will process an output signal from the probe to supply an input to the read out device such that the read out device will indicate the current fluid level in the container associated with the probe.

In accordance with this invention, a liquid level measuring system is provided which may be readily adapted for various uses, particularly for use in measuring the levels of liquids used in motor vehicles. A liquid level probe having a positive temperature coefficient conductor as a sensing element is mounted on a support member which provides thermal and electrical insulation. The positive temperature coefficient conductor is supported by the insulating support member in such a way that the fluid in which it is immersed readily drains from the conductor. Thus, only the portion of the conductor submerged in the fluid is covered by the fluid.

A microprocessor based electronic circuit is provided for energizing the probe from an energy source, and processing a signal received from the probe to energize a display means for indicating the current level of the fluid sensed by the probe. The electronic circuit includes a constant current power supply for energizing the positive temperature coefficient conductor of the probe such that the voltage appearing across the conductor provides an indication of the relative portion of the conductor immersed in the fluid.

The three principal components of the system, the liquid level probe, the microprocessor based electronic circuit, and the display means, may in one embodiment be all mounted on the dip stick typically provided in internal combustion engines for measuring the oil level. In another embodiment the components may be separated whereby the read out device may be mounted on the dash of a vehicle. In a preferred embodiment of the invention, the system is energized from a battery by a momentary switch and a timing means, such that the system is only energized long enough for the read out device to give an indication of the fluid level. Thus, the use of battery energy is conserved.

BRIEF DESCRIPTION OF THE DRAWINGS

FIG. 10a is a side elevation view with a portion in cross-section of another embodiment of the sensor assembly of this invention.

FIG. 10b is a cross-sectional view of the sensor assembly shown in FIG. 10a secured in a drain plug.

DETAILED DESCRIPTION OF THE PREFERRED EMBODIMENTS

Figure 1:
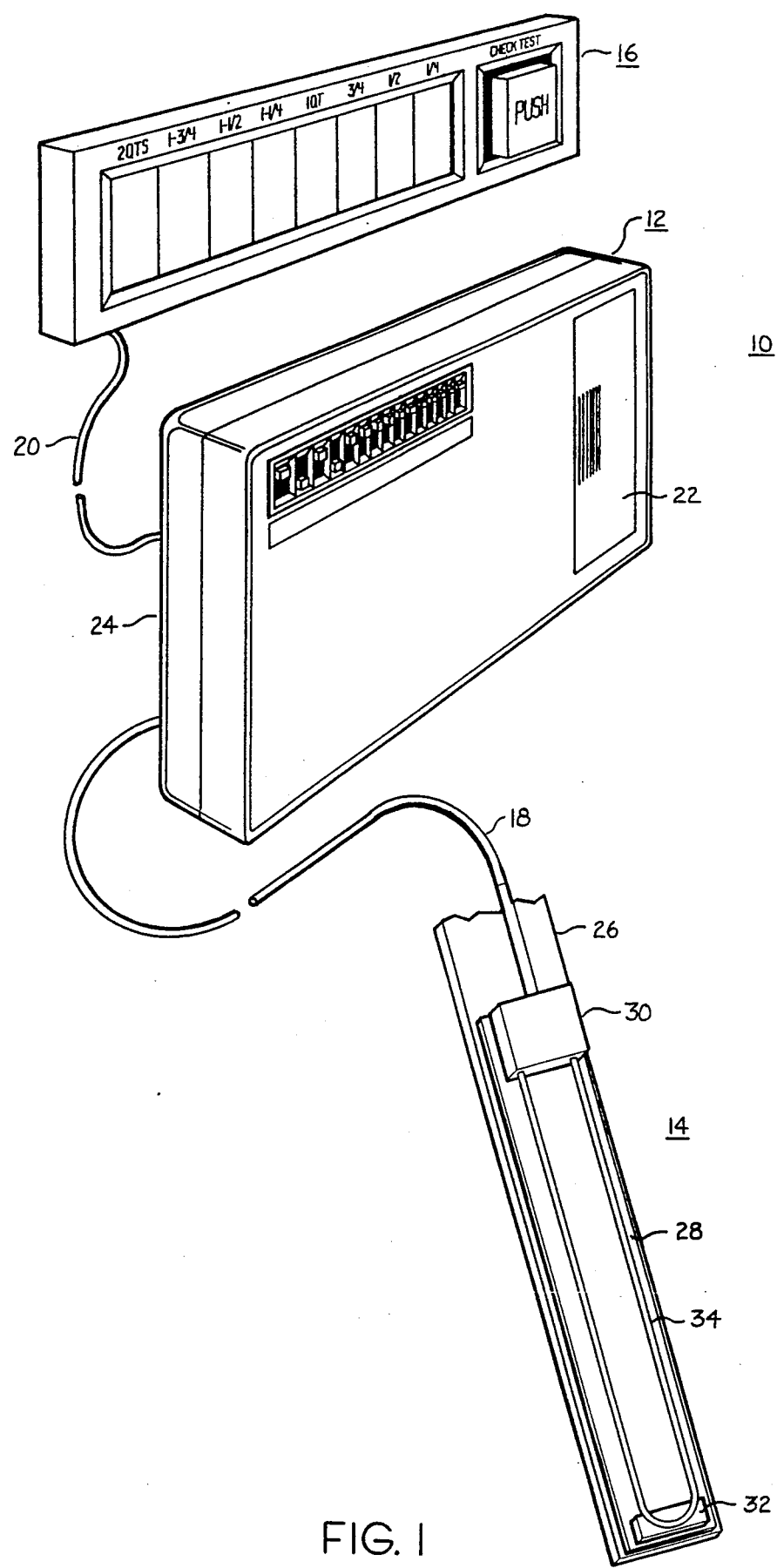
FIG. 1 is a perspective view of one embodiment of the system of this invention for measuring the level of a liquid in a container adapted for use in measuring the level of oil in the oil pan of a engine.

Referring to FIG. 1, a preferred embodiment of this invention utilized for measuring the level of oil in the pan of an internal combustion engine is shown. The system 10 includes three principal components, an electronic module 12, a sensor probe assembly 14 and a digital display assembly 16. The electronic module is connected to the sensor probe assembly 14 by a first cable 18. The electronic module 12 is also connected to the digital display assembly 16 by a second cable 20. Power for energizing the system 10 is provided by a battery 22 which is received within a housing 24 of the electronic module 12.

The sensor probe assembly 14 is shown mounted on a dip stick 26, only a portion of which is shown. The sensor probe assembly, which will hereinafter be described in greater detail, includes an insulating mounting board 28 having insulating support members 30 and 32 at opposite ends for supporting a U-shaped loop of a positive temperature coefficient conductor 34.

Figure 2:
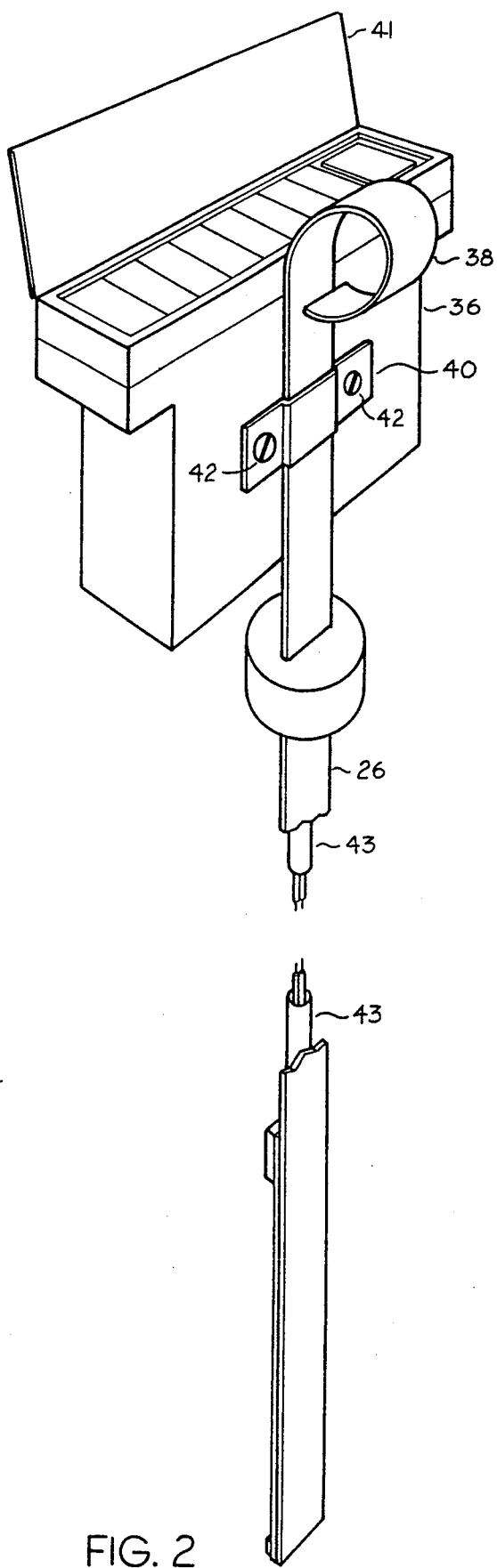
FIG. 2 is a perspective view of another embodiment of the liquid level measuring system of this invention, which is also adapted for measuring the level of oil in the oil pan of an engine.

Referring to FIG. 2, another embodiment of the invention is shown. The electronic module and the digital display assembly are combined into a single unit 36 which is secured to a dip stick 26 adjacent its handle 38 by a bracket 40 and securing devices 42. The display is protected by a cover 41 when not in use. The sensor probe assembly as shown in FIG. 2 is essentially the same as that shown in FIG. 1. The wires extending from the probe to the electronic package 36 are contained within a protective tubing 43.

While the embodiment shown in FIG. 1 would be more convenient for the user of a motor vehicle, wherein the read-out can be placed for viewing from the driving position, the installation of the assembly shown in FIG. 2 would be simpler. Use of the system shown in FIG. 2 would still eliminate the undesirable aspects of using the dip stick to measure the level of the liquid.

Figure 3:
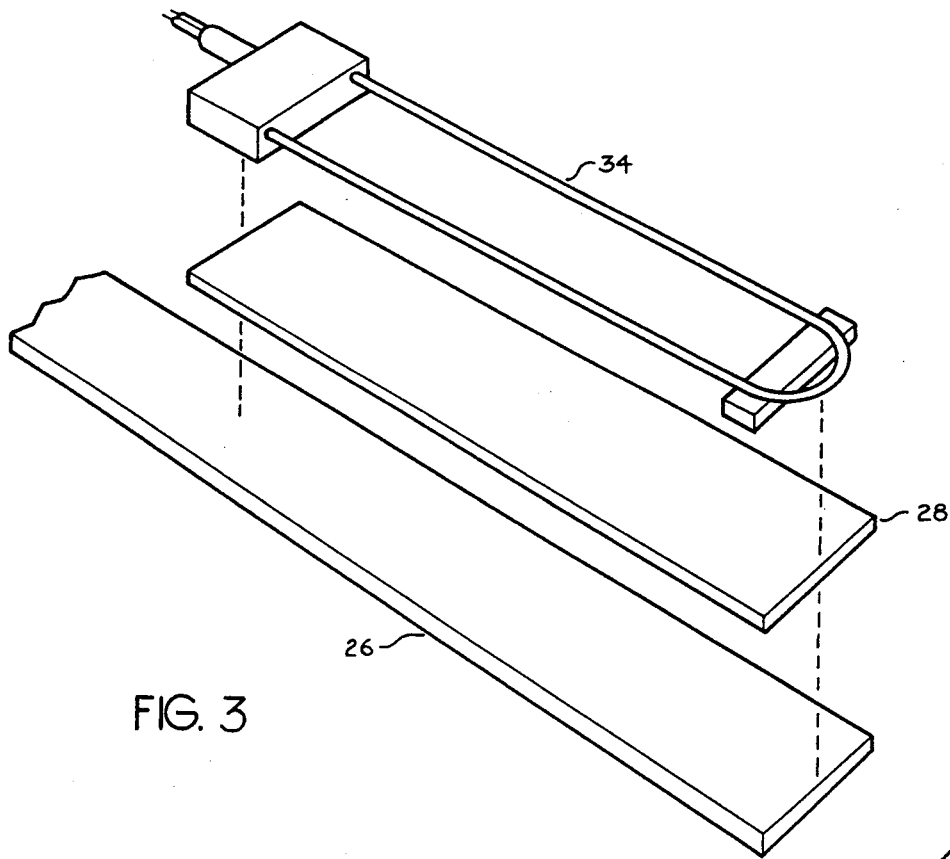
FIG. 3 is an enlarged view of the sensor assembly of the liquid level measuring system of FIGS. 1 and 2.
Figure 4:
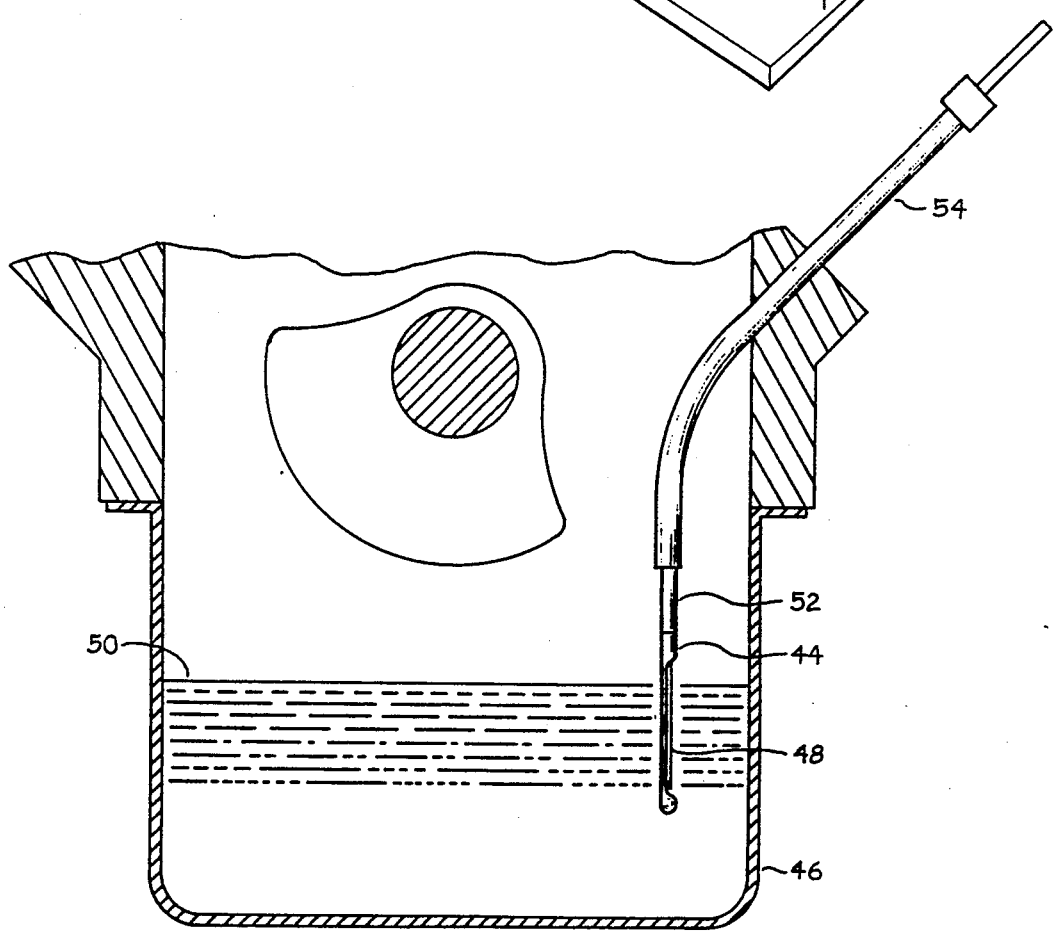
FIG. 4 is a side view of a partial cross-section of an engine and its oil pan showing the use of the liquid level measuring system of this invention for measuring the level of oil therein.

Referring to FIG. 3, an enlarged exploded perspective view of the sensor probe assembly is shown. A board 28 which provides electrical and thermal insulations may be secured to the dip stick 26 by any suitable fastening means which is not degraded by the presence of the fluid being measured, such as hot motor oil. The positive temperature coefficient conductive loop 34 in a preferred embodiment is formed of 37 gauge wire having a resistance of between 5 and 25 ohms per linear foot. A positive temperature coefficient wire suitable for use is marketed under the trade name "BALCO".

Figure 5:
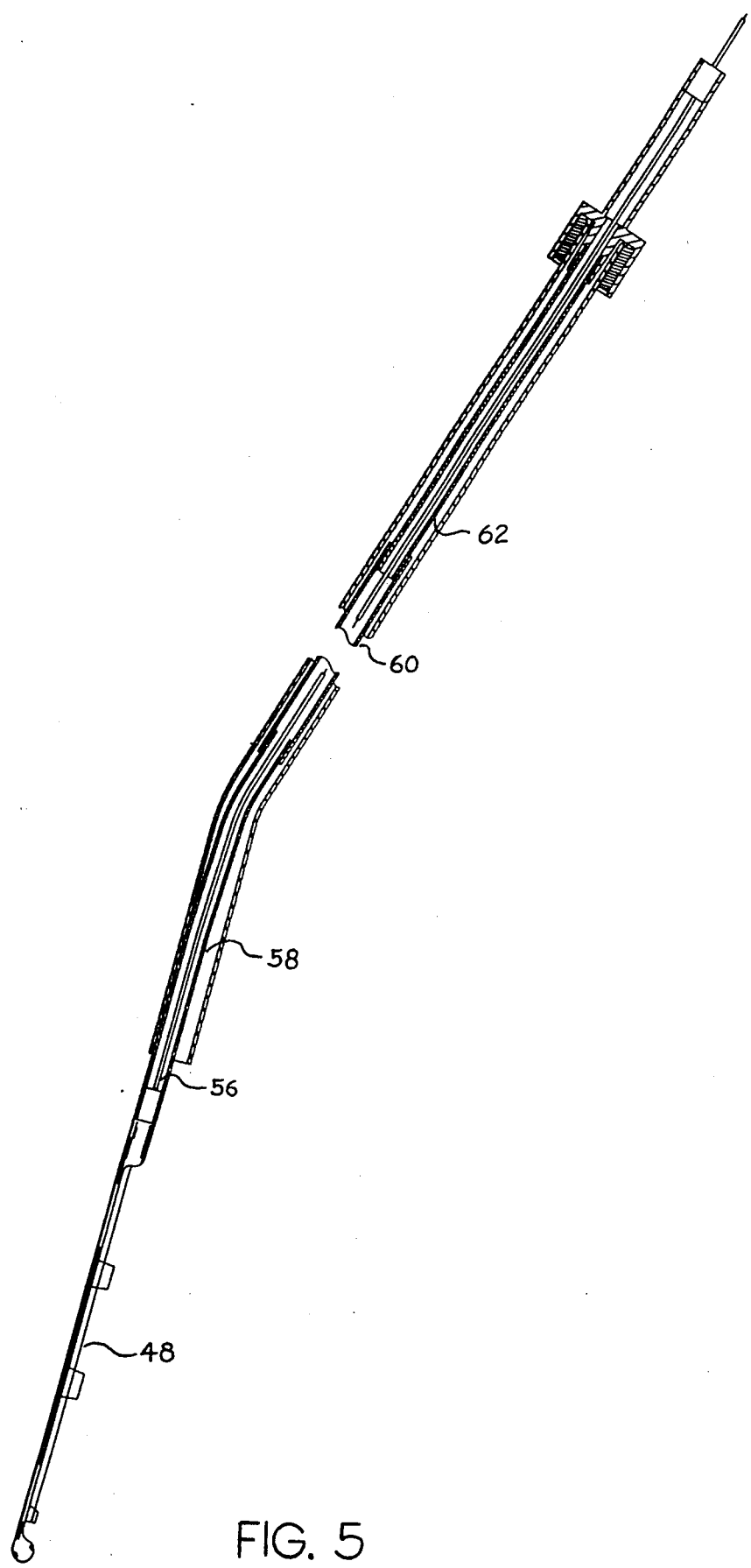
FIG. 5 is a cross-sectional view of the sensor shown in FIG. 4.

A second embodiment of the probe assembly of this invention is shown in FIGS. 4 through 8. In this embodiment, the probe assembly is a replacement for, rather than being mounted on the usual dip stick. The probe assembly 44 is shown positioned in oil pan 46 of an internal combustion engine. The probe 44 is positioned such that the positive temperature coefficient conductor 48 is normally engaged by the surface 50 of the fluid in the pan over the normal range of surface levels. The probe assembly 44 is supported by a elongated member which extends through the dip stick support tube 54. As shown in FIG. 5, the conductor 56 extends through the elongated support tube 52. The support tube 52 is formed of three portions, 58, 60 and 62. The portions 58 and 62 are telescopically received within the portion 60, such that the overall length of the support tube 52 may be adjusted to properly position the probe in the fluid, the level of which is to be indicated.

Figure 6:
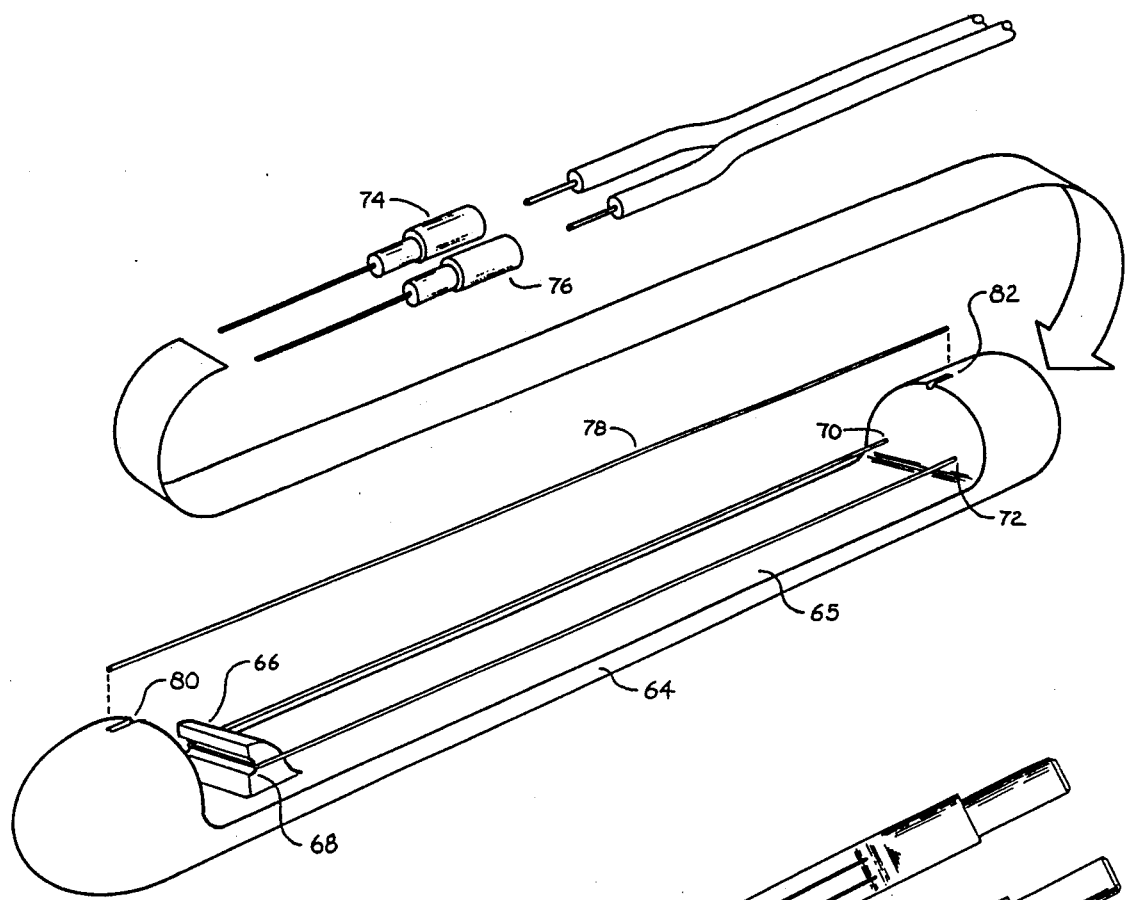
FIG. 6 is a perspective view of a portion of the sensor shown in FIG. 4.
Figure 6A:
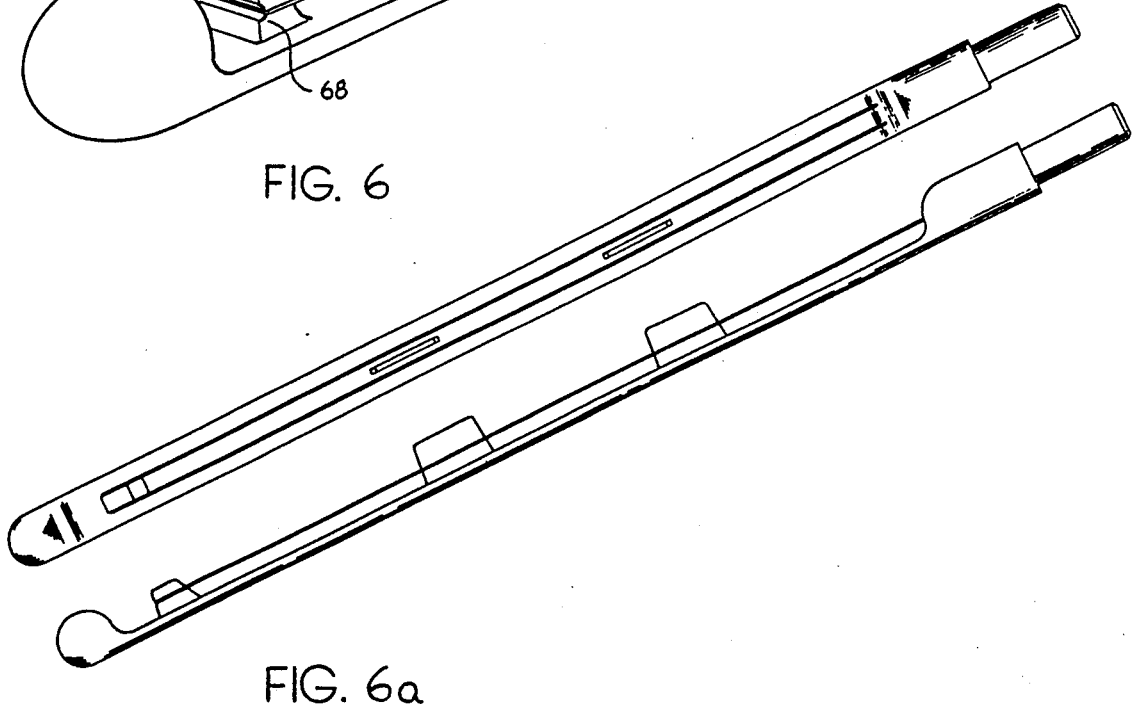
Figure 7:
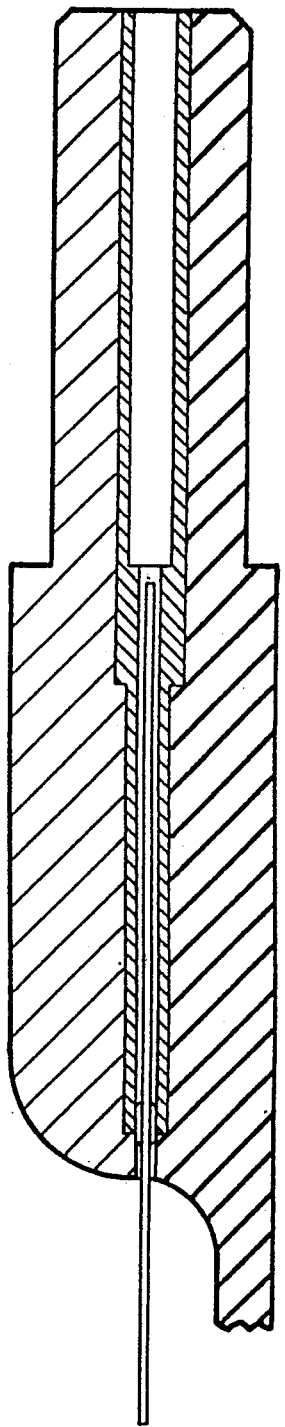
FIG. 7 is a partial cross-sectional side view of a portion of the sensor shown in FIG. 4.
Figure 8:
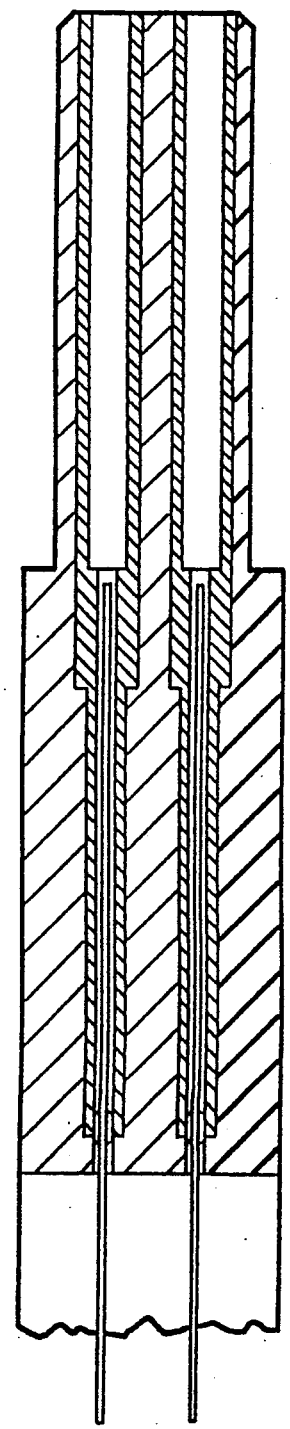
FIG. 8 is a partial cross-sectional top view of a portion of the sensor shown in FIG. 4.

As shown in FIG. 6, the probe includes a generally cylindrical insulating support member 64, a sector 65 of which is removed to provide a cavity in which is supported the positive temperature coefficient conductor 48. The support member 64 is provided with a lug 66 which has a notch 68 therein for receiving a portion of the positive temperature coefficient conductor. The positive temperature coefficient conductor 48 extends through two small holes 70 and 72 formed in the upper end of the support member. After the ends of the positive length coefficient conductor have been extended through the holes 70 and 72, a pair of connector sockets 74 and 76 are secured to the ends of the conductor. The cylindrical support is then flexed or bent such that the sensing wiring can be engaged in the notch 68 and held tautly therein by the housing flexing back to its extended or straight position. A protector rod 78 is placed in a pair of notches 80 and 82 formed in the housing and secured therein. Further details of the connections of the sockets 74 and 76 to the conductor 48 and its positioning in the holes 70 and 72 in the support member 64 are shown in FIGS. 7 and 8.

Figure 9:
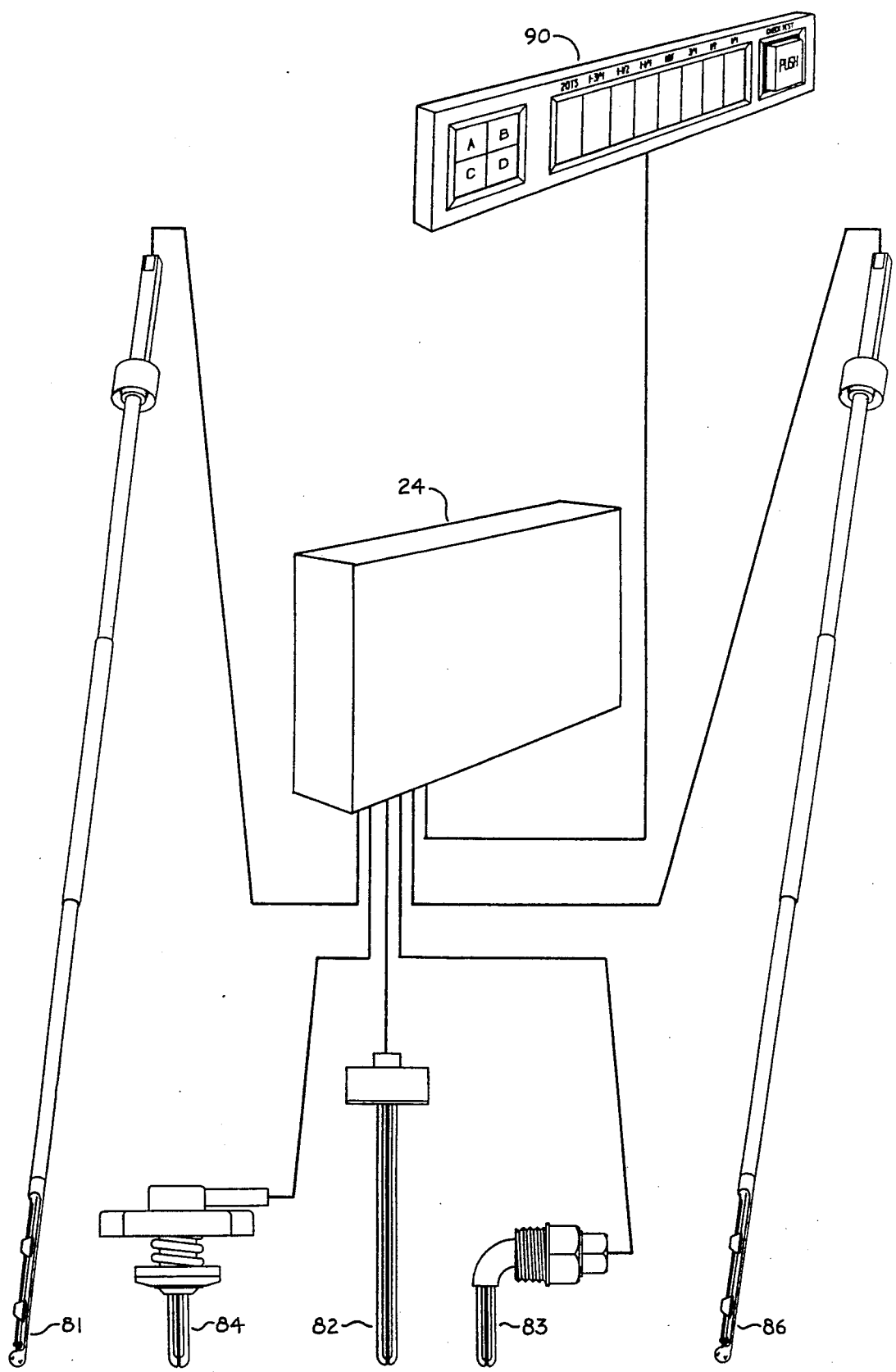
FIG. 9 is a perspective view of still another embodiment of this invention particularly adapted for use in the measurement of several fluid levels in a motor vehicle.

As shown in FIG. 9, by modifying the configuration of the sensing probe, the liquid level measuring system of this invention is adapted for use in sensing the level of various liquids utilized in a motor vehicle. For instance, in addition to the sensor 81 used to determine engine oil level, a sensor 83 may be utilized for the determining the level of the fluid in a differential housing, a sensor 84 for determining the coolant level, a sensor 86 for determining the transmission fluid level in an automatic transmission or a sensor 82 for determining the fluid level in a window washer container. When the liquid level sensing measuring system is used for multiple fluids, a digital display assembly 90 is modified to provide means for selecting the particular fluid level which is to be observed. For instance, the key labeled "T" may be actuated to observe the transmission level, the key "E" actuated to observe the engine oil level, the key "D" actuated to measure the differential fluid level or the key "W" actuated to measure the coolant level. The desired fluid level is then caused to be displayed by actuating the momentary key "C".

The probe assembly 81 shown in FIG. 9 for measuring the engine oil is shown in FIGS. 10A and 10B in a different configuration, the probe being installed in the bottom of the engine oil pan. An elongated insulating support member 92 is secured to a plug 94. The positive temperature coefficient conductor 48 is received in a notch 96 at the end of the support member 92. The free ends of the conductors are secured to a pair of terminals 98 and 100 which are insulated and from supported in the plug 94. Elongated slots 102 are provided in the support 92 to prevent the liquid from adhering to and remaining between the conductor 48 and the support member 92. As shown in FIG. 10b, the plug 94 is received in a threaded hole provided in a drain plug 104 which is received in a threaded hole in the container wall 106.

Figure 11:
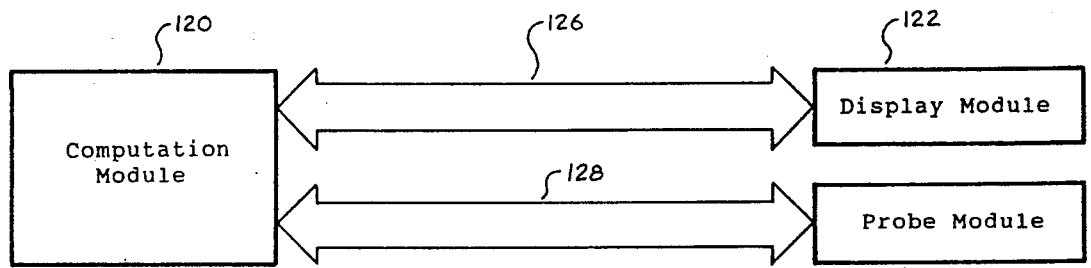
FIG. 11 is a block diagram of the liquid level measuring system of this invention.

Referring now to FIG. 11, a block diagram of the preferred electronic circuit of the liquid measuring system of this invention is shown. As shown in FIG. 1, the system includes a computation module 120, a display module 122 and a probe module 124. A suitable electric cable 126 is provided to connect the computation module 120 and the display module 122 while an electrical cable 128 connects the computation module 120 and the probe module 124.

Figure 12:
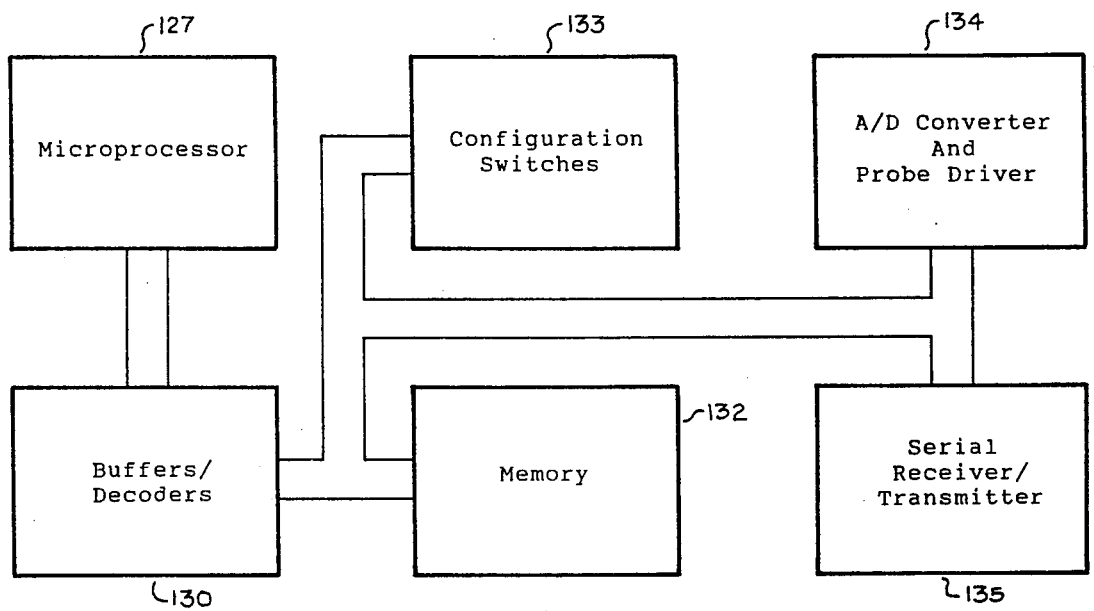
FIG. 12 is a block diagram showing further details of the computation module shown in FIG. 11.

The computation module is shown in further detail in FIG. 12. The computation module includes a microprocessor 127. A suitable microprocessor for use in this application is commonly identified as a "Z80". The address, control and data buses of the microprocessor 127 are connected to buffers and decoders 130. Upon resetting of the electronic circuitry, such as by actuating the momentary key "C" in FIG. 9, the central processor 127 executes, through the buffers and decoders 130, a program stored in a ROM portion of a memory block 132 and stores the data generated in a RAM portion of memory block 132.

The buffers portion of block 130 have the address, data, and control lines of the microprocessor as inputs and provide these signals to the remainder of the computation module. The buffers have the capability to drive the load presented by the devices of the computation module and isolate the CPU from that load. The decoders portion of block 130 use the buffered address and control lines to determine if a memory address or input/output port address is being supplied by the microprocessor to enable the device at the selected location for a read or write cycle.

The configuration switches shown as block 133 provide the ability for the end user to provide information about the allowable fluid levels for the particular container being measured In the case of engine crankcase oil level, the information for setting these switches would be derived from markings on the existing dip stick.

Block 134 provides analog to digital conversion circuitry and probe driver circuitry. The analog to digital converter circuit provides an indication of the voltage developed across the probe to the microprocessor 127. The probe driver circuitry provides a constant current through the probe so that the change in voltage developed across the probe can be measured.

The computation module includes a serial receiver and transmitter 135. A suitable device for this application is commonly identified as a Z80 DART (Dual Asynchronous Receiver Transmitter.) The Z80 DART provides two serial channels for input and output and several software controllable outputs. One of the software controlled outputs is used as a control signal to switch "on" and "off" the constant current through the probe. Another software controlled output is used as a control signal to disable the power to the computation module. One of the serial channels and two software controlled outputs are provided to the display module shown in FIG. 13. The remaining serial channel is provided for the receipt of commands and transmission of data to an external controller such as an industrial controller or automotive engine control system, while still maintaining an operator viewable display.

Figure 13:
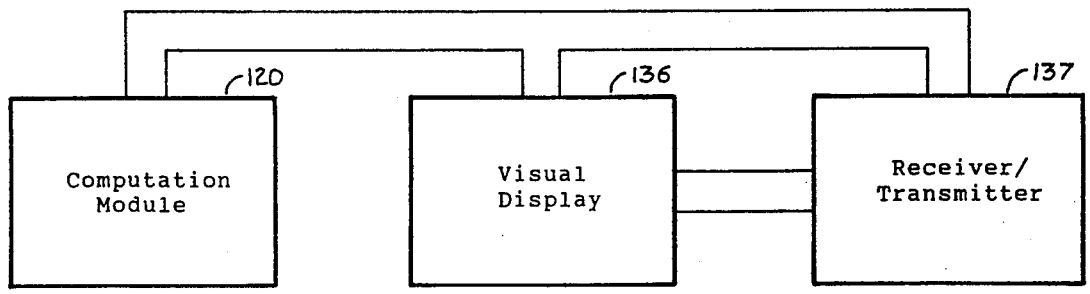
FIG. 13 is a block diagram showing further details of the display module shown in FIG. 11.

A display module provides the operator interface for operation of the system. Referring to FIG. 13, the display module is shown in more detail. Computation module 120 provides power and data to the display module and receives power control and probe selection data. Serial receiver transmitter block 137 converts the fluid level indication into parallel form for visual display and, in a multiple probe configuration, transmits probe selection information to the computation module. Block 136 provides the actual visual display and the power control and probe selection switches. The display may show actual digits as shown in FIG. 1 or may be a bar graph indication of fluid level as would be provided by the circuit shown in FIG. 18.

Figure 14:
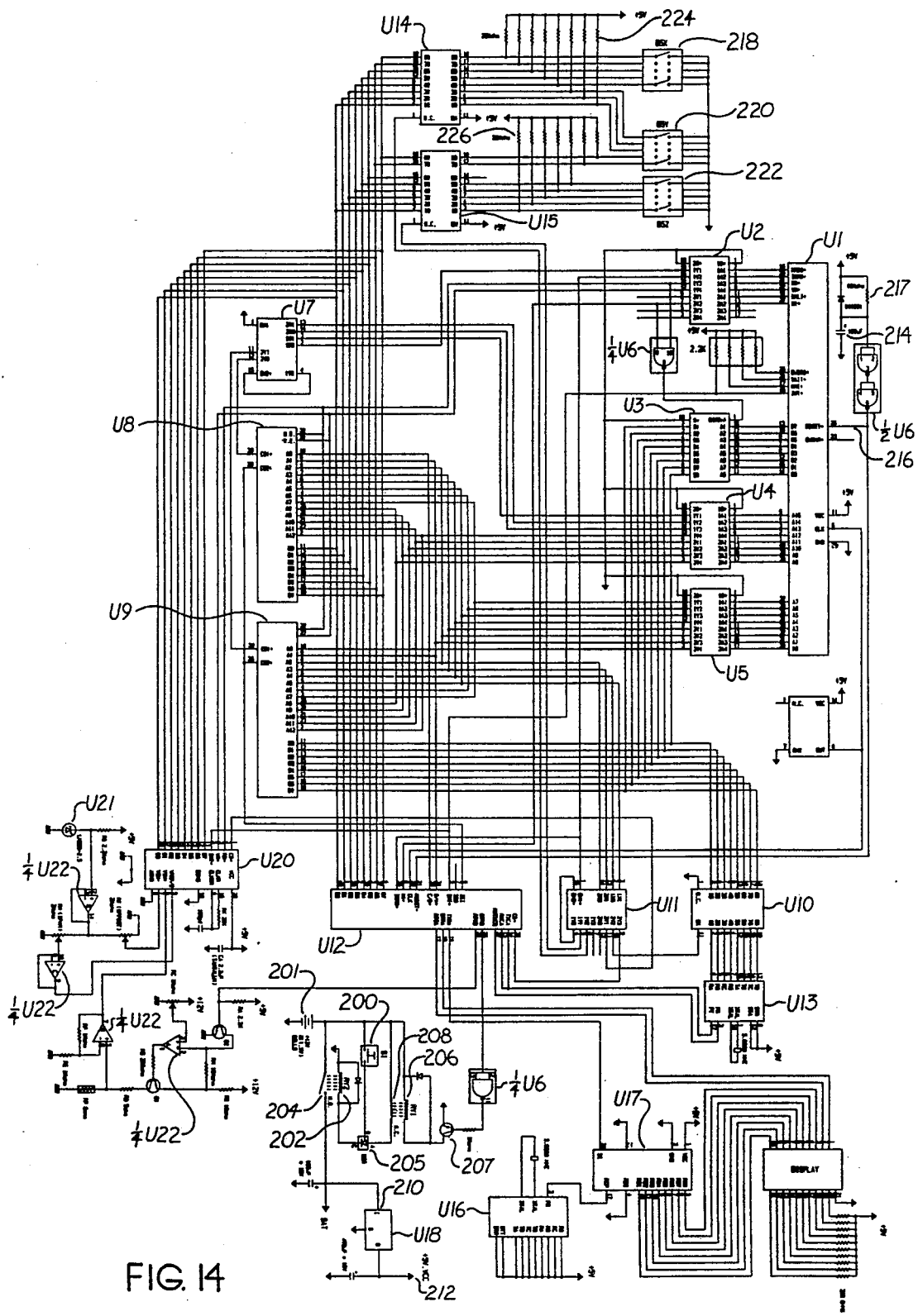
FIG. 14 is a detailed schematic diagram of the circuit shown in FIG. 11.

A preferred form of the control circuit is shown in FIG. 14. It is of sectionalized design, the sections being shown in further detail in FIGS. 15-20. The sections work together to determine the level of fluid in a receptacle. The complete system will be described by separately describing each subsystem that makes the complete system.

Figure 19:
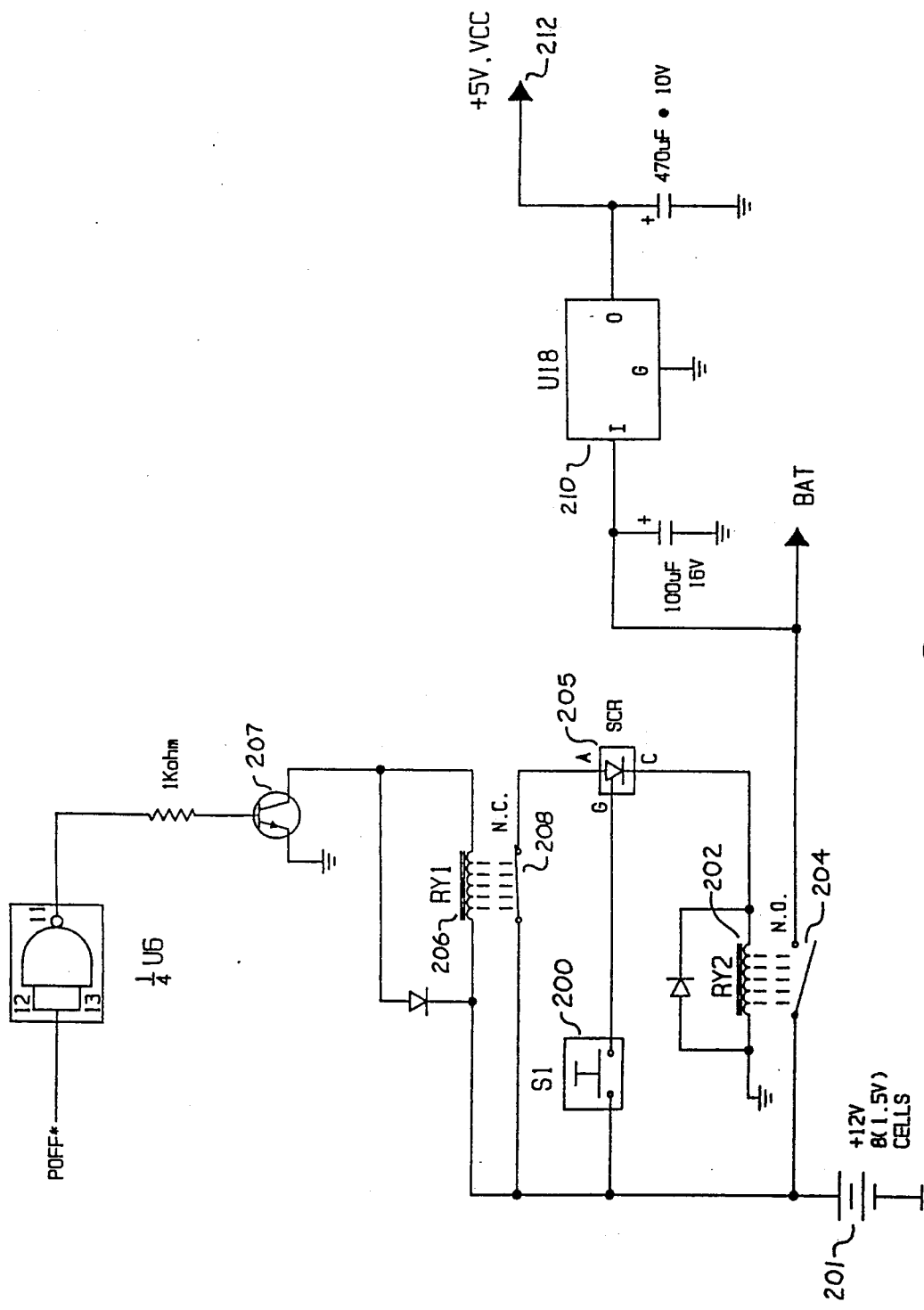
FIG. 19 is a more detailed block diagram of a portion of the circuit shown in FIG. 14, namely the power supply circuit.

Referring to FIG. 19, the system is shown in a powered off state. In this state, an SCR 205 is not conducting and a relay 202 is not energized causing its contacts 204 to be open. A relay 206 is not energized causing its contacts 208 to be closed and causing the 12 volts from battery 201 to appear across the anode and cathode of SCR 205. Switch 200 is a momentary push button whose contacts are normally open. The switch 200 is normally located in the display module 122.

Pressing momentary pushbutton 200 causes its contacts to close providing a voltage to the gate of SCR 205. This voltage causes SCR 205 to conduct energizing the coil of relay 202 and causing contacts 204 to close. With relay contacts 204 closed, battery power is supplied to a regulator 210 which provides regulated 5 volt power to the rest of the system.

Once SCR 205 starts conducting, it will continue to conduct when pushbutton switch 200 is released. To conserve battery power, a means is provided for the microprocessor to disconnect power from the system when not in use. This is accomplished through control signal POFF* which is asserted by the microprocessor via the DART. When the system is powered on, POFF* is at logic level 1. As will be described later with respect to FIG. 15, a NAND gate inverts POFF* and provides the inverted signal to the base of a transistor 207 keeping it turned off. When POFF* is active, a logic level 1 signal is placed at the base of transistor 207 causing it to conduct. This energizes relay 206 causing contacts 208 to open. When contacts 208 open, power is disconnected from SCR 205, causing it to turn off and stop conducting. When SCR 205 stops conducting, relay 202 turns off and contacts 204 open. When contacts 204 open, the battery is disconnected from the regulator 210 and the system turns off.

Figure 15:
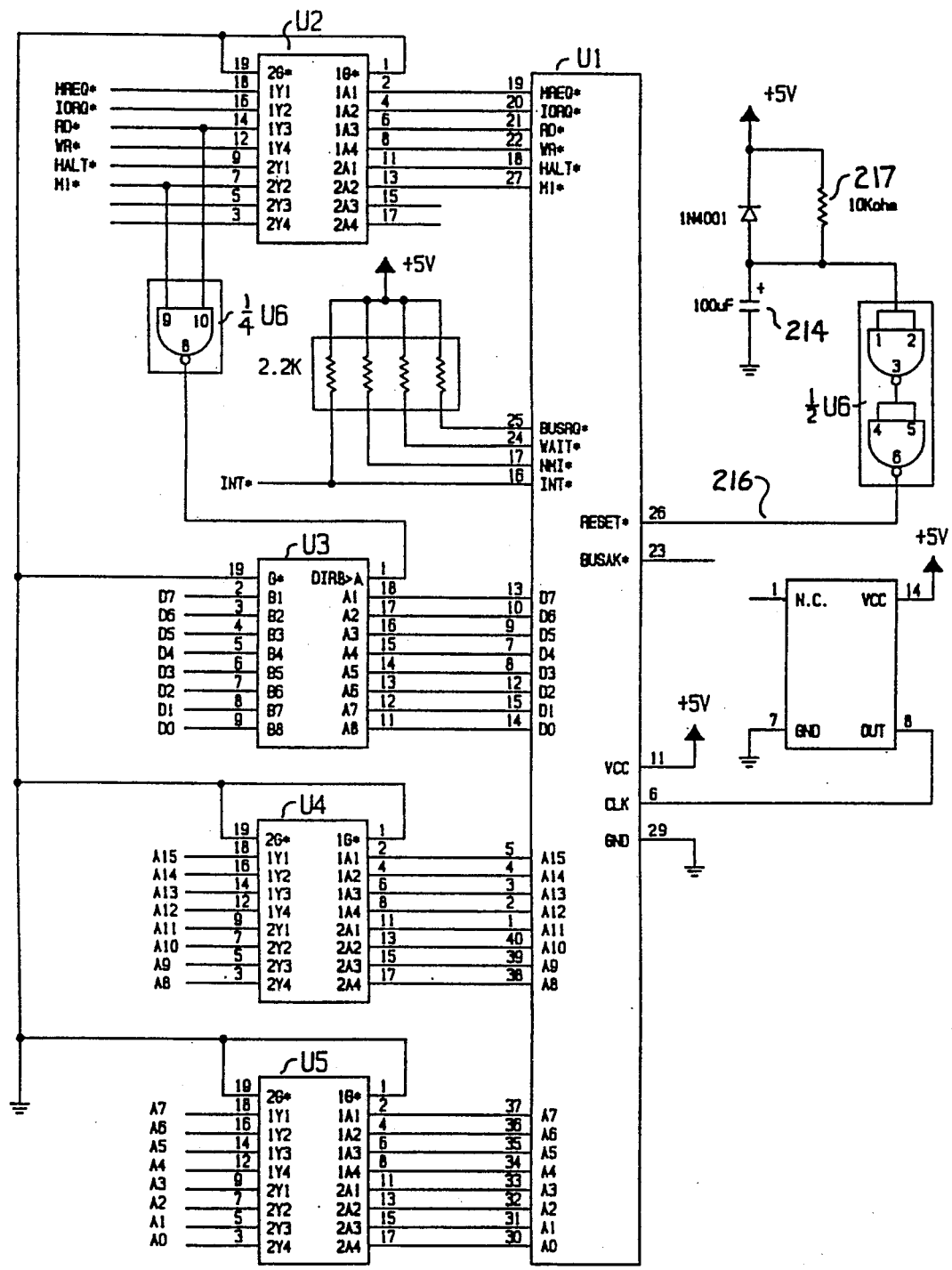
FIG. 15 is a more detailed schematic diagram of a portion of the circuit shown in FIG. 14, namely the cpu, reset and the buffers.

The regulated voltage at terminal 212 is provided to the microprocessor U1 and its support circuitry U2, U3, U4, U5 and U6, which are best shown in FIG. 15. As regulated voltages stabilize in the electronics package, capacitor 214 begins charging through resistor 217 which in a preferred embodiment has a resistance of 10K ohms. Output terminal 216 of the first portion of U6 holds the reset terminal of microprocessor U1 low for about 250 milliseconds as power supply voltages stabilize. When the voltage across the capacitor 214 reaches 2.4 V the reset terminal is switched to a logic 1 and the microprocessor U1 begins execution of power on test routines.

The microprocessor address, control, and data buses are buffered by U2, U3, U4, and U5. The data bus of microprocessor U1 is buffered by U3 which is a bidirectional device. The direction in which U3 drives is determined by a second portion of NAND gate U6. When M1* and RD* are both at logic level 1, the second portion of U6 configures U3 to accept input from the microprocessor U1 and provides it to be read from the data bus represented by D0 through D7. When either M1* or RD* is at logic level 0, U3 passes data from the data bus to the microprocessor U1.

Control signals MREQ*, RD*, M1*, and WR* are microprocessor outputs which are buffered by U2. The INT* signal is an interrupt signal to the microprocessor. When INT* is logic level 0, it indicates to the microprocessor that there is an interrupt pending. To keep INT* from triggering errantly, it is tied to +5 V through a 2.2K resistor, as are microprocessor input signals BUSREQ*, WAIT*, and NMI*. All microprocessor timing originates from U16, a 4.000 MHz oscillator circuit.

Figure 16:
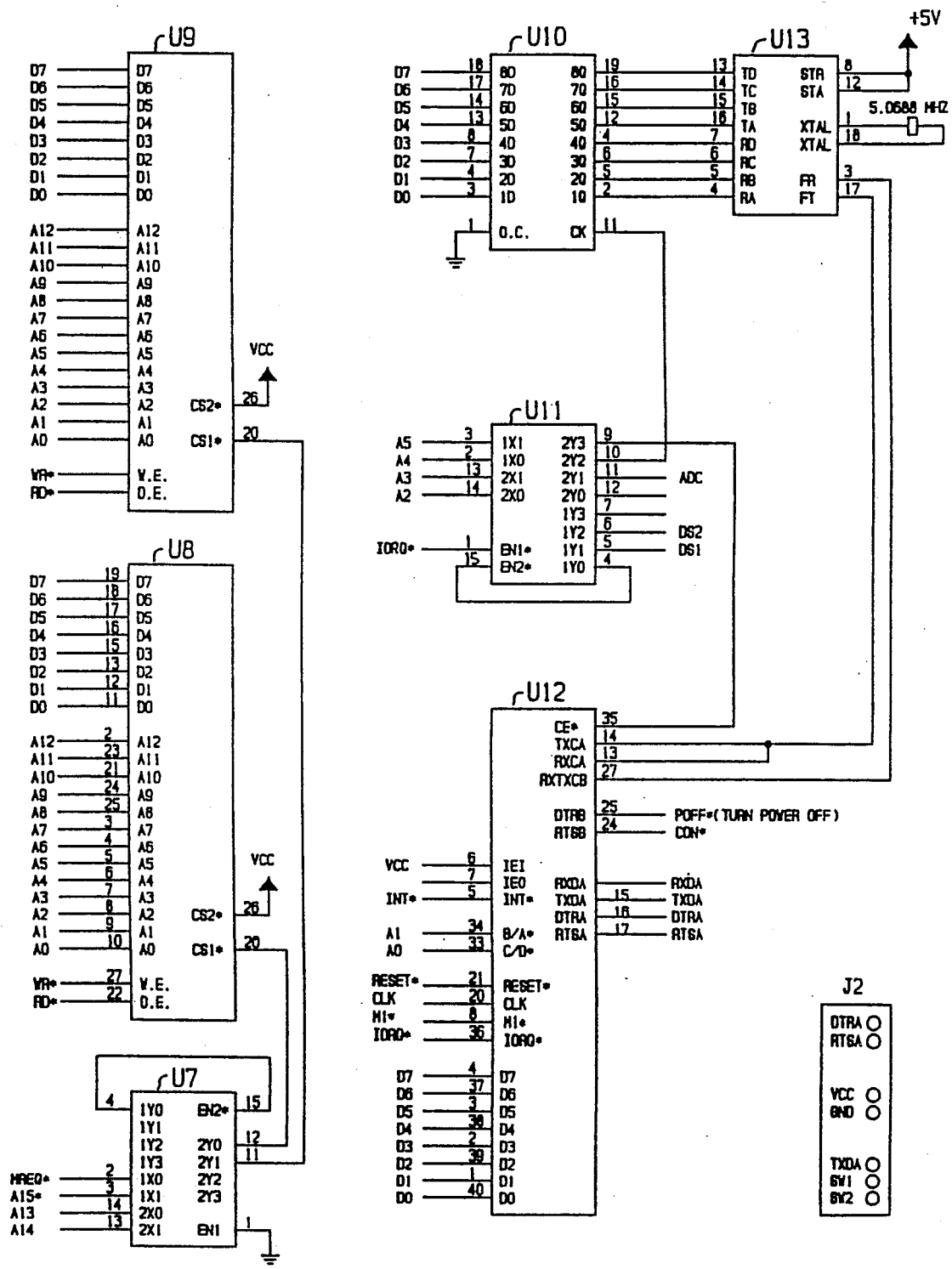
FIG. 16 is a more detailed schematic diagram of a portion of the circuit shown in FIG. 14, namely the memory, decoding, serial clock and data to display components.

The address, data, and control buses of the microprocessor U1 are connected to non-volatile memory (EPROM) U8 and volatile memory (RAM) U9 which is best shown in FIG. 16. After reset, the microprocessor U1 executes the program in the EPROM U8 and stores data in the RAM U9. Memory devices are selected by dual 2 to 4 decoder U7 which monitors the control bus for the MREQ* from U2 signal to become logic level 0. When MREQ* is at logic level 0 address lines A15, A14, and A13 select which memory device will respond to the microprocessor U1.

The IORQ* control signal from U2 is used to select other devices in the system. The IORQ* signal along with A5, A4, A3, and A2 are used by dual 2 to 4 decoder U11 to provide outputs which determine which device the microprocessor wants to transfer a byte to or from.

Figure 20:
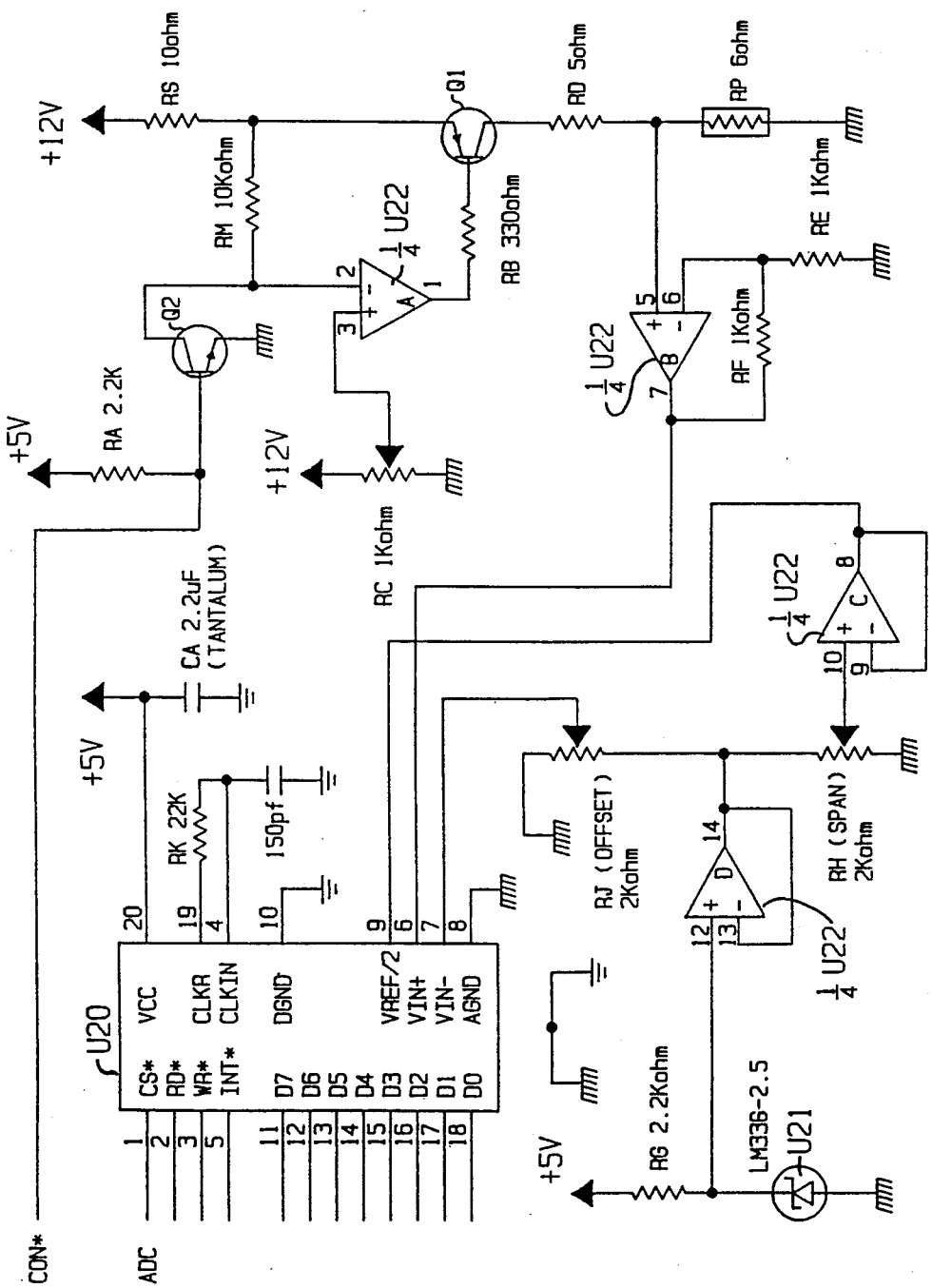
FIG. 20 is a more detailed schematic diagram of a portion of the circuit shown in FIG. 14, namely the probe driver and reader circuit.

The microprocessor U1 turns on the probe current, turns off the system power, and drives the display through a Dual Asynchronous Receiver Transmitter (DART) U12 which is best shown in FIG. 20. The DART is selected by U11. System power is disconnected when DART pin 25 is set to logic level 0. The probe current is turned on when DART pin 24 is set to logic level 0.

Referring to FIG. 16, the DART U12 provides three signals to the display package. A serial bit stream which is the level to be displayed comes from pin 15. The power on indication and reading complete indication come from pins 16 and 17 respectively. The DART provides a serial input from which an external controller can send commands. This is useful if the electronics package is slave to another controller, as opposed to operating as a stand-alone unit.

The data clock for the serial bit stream generated by the DART is provided by U13, a programmable bit rate generator which is best shown in FIG. 16. The bit rate is selected by U10 which stores a byte sent to it by the microprocessor and in turn provides this byte to U13. The bit rate generated by U13 is 16 times the data rate.

Figure 17:
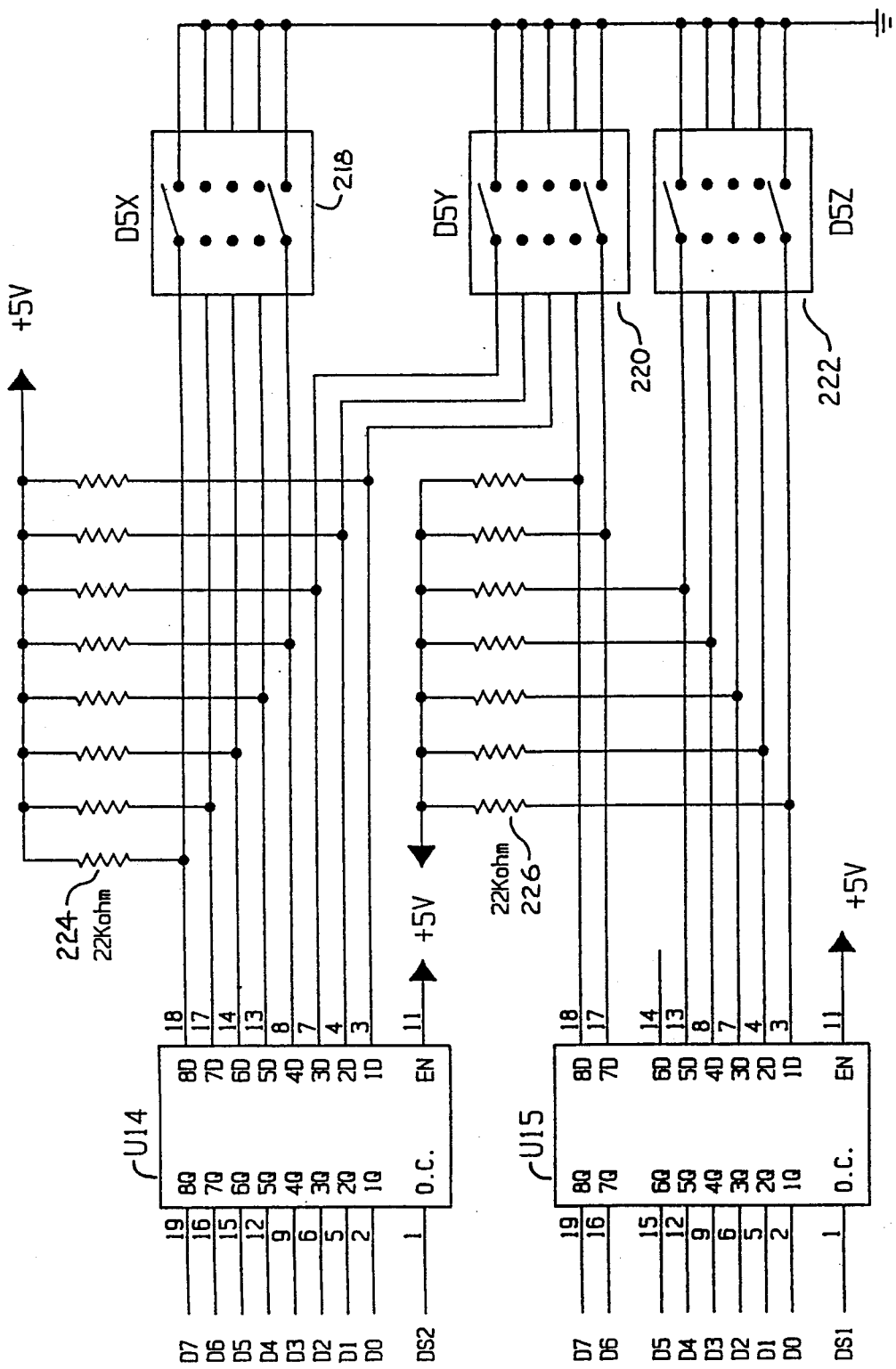
FIG. 17 is a more detailed block diagram of a portion of the circuit shown in FIG. 14, namely the dip-switch read circuit and buffers.

As shown in FIG. 17, three sets of switches 218, 220 and 222 are read by the microprocessor U1. These switches are connected to the inputs of U14 and U15. Resistor blocks 224 and 226 are used to hold these inputs high. When a switch is closed, and input is forced low. The buffer U14 echoes its input to the microprocessor U1 when DS2 is set to logic level 0. The buffer U15 echoes its inputs to the microprocessor U1 when DS1 is set to logic level 0. Signals DS1 and DS2 are generated by decoder U11 shown in FIG. 16.

Figure 18:
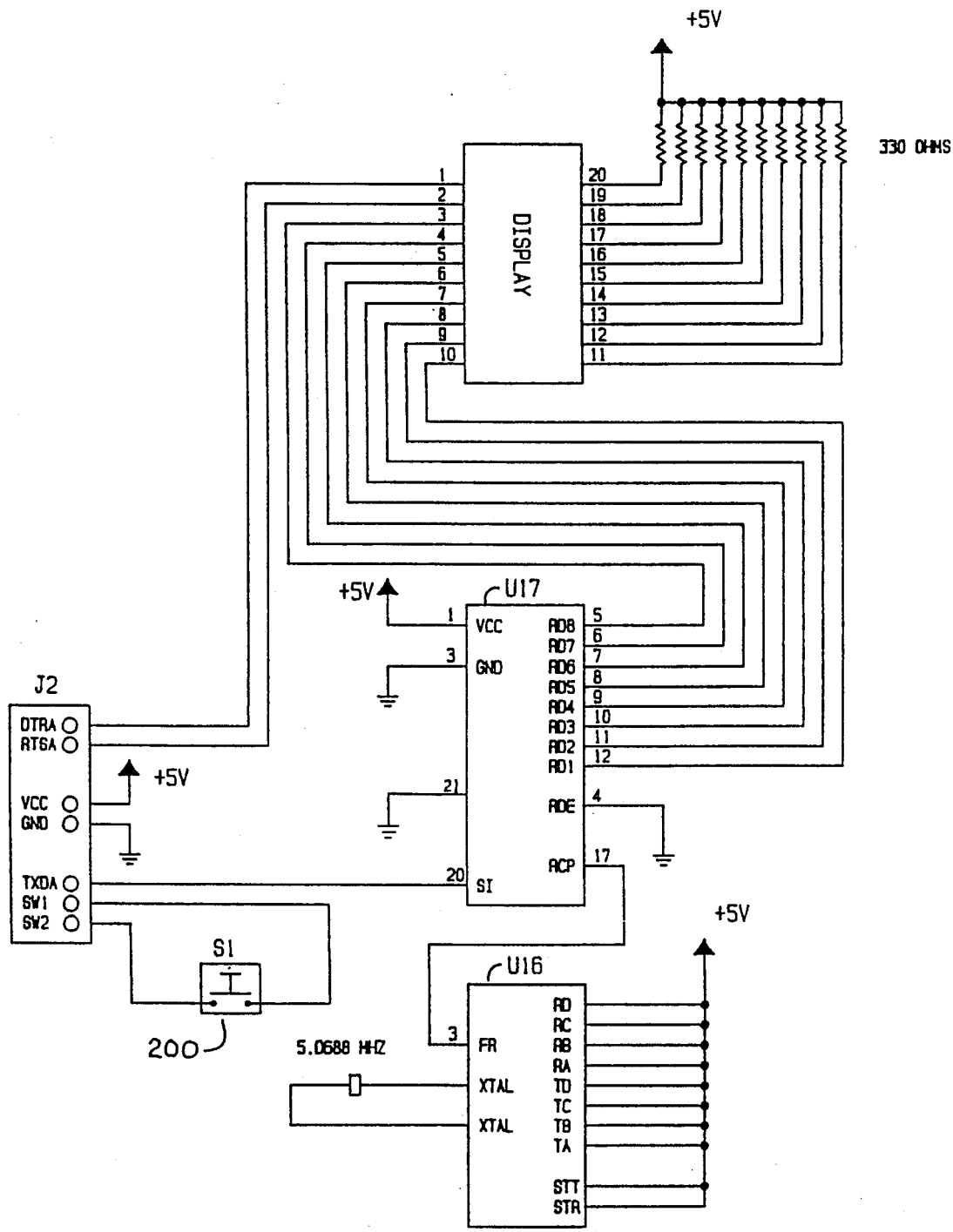
FIG. 18 is a more detailed block diagram of a portion of the circuit shown in FIG. 14, namely the display unit and drivers.

Referring to FIG. 18, the circuitry for the display module is shown. The display is implemented as ten light emitting diodes, one to indicate a fault condition exists, one to indicate power is on and a measurement is in progress, and a bargraph of eight to indicate the measured fluid level. The power on and fault indicators are driven by the U12 shown in FIG. 16. The bargraph is driven by U17, a Universal Asynchronous Receiver Transmitter (UART). A preferred UART for this application has separate pins for received data and transmit data. The received data lines are always enabled by RDE. A display segment will turn on when the corresponding control line is logic level 0. The UART receives the serial data to be converted to parallel and displayed on the bargraph from U12 shown on FIG. 16. The UART receives its serial data clock from U16. Connector J2 connects the display module to the computation module. The display module receives its power through this connector as well as the data to be displayed. The connections for the "power on" switch are also routed through this connector.

The transmit functions are not used in this embodiment, but rather are left as spares for selecting between multiple probes for measurement. A character oriented display could be implemented by using the upper four bits of the received data to select a character and the lower four bits to represent the digit to be displayed at that location.

The probe current is controlled and regulated by the circuit shown in FIG. 20. The probe current regulator and the analog to digital converter circuitry have a separate "analog" ground. Note that references to "ground" in the discussion for FIG. 20 refer to the analog ground unless specified otherwise. The grounds are separated to avoid noise from the digital logic systems interfering with the analog to digital conversion process. The analog ground and the digital ground connect at a single point as shown in FIG. 20.

The signal CON* originates on DART pin 24. When CON* is at logic level 1, transistor Q2 is turned on and holds the non-inverting input of operational amplifier U22(a) at ground. This causes U22(a) to output the maximum positive voltage it is able to, which turns off transistor Q1. With Q1 turned off, no current will flow through the probe.

When CON* is low, transistor Q2 is turned off. With Q2 off, the voltage at the connection point between RS and RM is present at the inverting input of U22(a). The non-inverting input of U22(a) is connected to potentiometer RC which adjusts the magnitude of the probe current. The output of U22(a) will be the difference between the reference voltage selected by RC and the voltage drop across RS. This difference will always be less than the base voltage of Q1, which will cause Q1 to conduct the probe current through its collector-emitter circuit. RC is normally set to output 8 volts, which will cause a 400 Ma probe current with a 12 V battery voltage.

The circuit regulates the probe current by forcing the voltage drop across RS to be equal to the voltage present at the non-inverting input of U22(a). If the voltage drop across RS exceeds the voltage present at the non-inverting input of U22(a), then U22(a) will compensate by making its output more positive thereby reducing the base current out of Q1 and reducing its collector-emitter current. In practice, this happens instantaneously and the probe current is constant regardless of changes in the probe resistance.

As just described, the magnitude of the probe current is determined by RS. In another embodiment of this invention, the magnitude of the probe current can be adjusted by the CPU. That is, the CPU sets the magnitude of the probe current, and the circuit of U22 maintains the magnitude of the probe current as set by the CPU. In this embodiment, RS is replaced by a digital to analog converter. The analog output of the converter is connected to the non-inverting input of U22(a). A desirable feature of this embodiment is that the CPU will not only have on/off control of probe current, but also control of the magnitude of the probe current.

The voltage developed across the probe will range from 0 volts when the probe is inactive through 2 volts when probe current is on. This voltage is measured at point B which is connected to the non-inverting input of U22(b). The probe voltage is multiplied by 2 by U22(b). The output of U22(b) is connected to the non-inverting input of analog to digital converter U20.

The analog to digital converter used is an 8 bit converter of ratiometric design. The analog voltage span which the converter divides its 8 bit range into is set by the VREF/2 input. The offset voltage, for which the voltage span set by VREF/2 is above 0 volts, is set by the inverting input. The analog to digital converter will return a full scale digital reading for a voltage input that is equal to or greater than the span voltage plus the offset voltage. The analog to digital converter will return a digital reading of 0 when the voltage input is less than or equal to the offset voltage. The ADC0803 is an 8 bit analog to digital converter with an error of one-half LSB which is suitable for this application.

To make accurate analog to digital conversions, the span and offset voltages must be accurate, and more importantly, stable. The circuitry to generate these voltages is shown in FIG. 20. The voltages for the span and offset adjustments are derived from U21, a 2.5 volt precision voltage reference is connected to the non-inverting input of U22(d) which forms a unity gain buffer amplifier. The output of U22(d) drives potentiometer RJ which provides the offset adjustment. The output of RJ is connected to the inverting input of U20. The output of U22(d) also drives potentiometer RH which provides the span adjustment. The output of RH is connected to the non-inverting input of U22(c) which forms a unity gain buffer amplifier. The output of U22(c) is connected to the VREF/2 input of U20. The VREF/2 input of U20 has a gain of two, so the voltage present at that input is actually one half of the desired voltage span. Note that the analog ground AGND and the digital ground DGND are separate lines on U20, and are connected in only one location as shown in FIG. 20.

The analog to digital converter U20 is connected to the control and data busses of the microprocessor and is best shown in FIG. 20. Decoder U11 signal ADC* selects the analog to digital converter. When selected, the analog to digital converter transfers a byte to the microprocessor when RD* is active and a new conversion is initiated when WR* is active.

The operation of the system will now be reviewed. Actuation of switch 200 initiates a sequence of events which results in the oil level being displayed to the user. Switch 200 could be actuated by the opening of a cover of the display unit.

Actuation of switch 200 causes power to be applied to the electronics package and the measurement process to begin. The voltage regulator begins providing power to the logic circuits. A battery voltage level detector may be provided to determine the strength of the battery such that if the voltage is low, the system will not operate so that incorrect measurements will not be generated.

To provide the logic voltage supply time to stabilize, a power on reset circuit delays the microprocessor start-up for 250 milliseconds. After the delay, the microprocessor begins executing the control program in the EPROM. The first part of the control program initializes the display and reads the selector switches. A system self test is also done to verify the system is working properly. The display will indicate that a self test is in progress, and thereafter that the system passed or failed the self test.

If the system passed the self test, current is applied to the probe. The voltage developed across the probe should continuously increase A zero volt reading indicates that there is a short circuit in the probe. A voltage greater than the expected maximum indicates that the probe has been damaged (open circuit). Any fault will cause the "fault" indicator to blink. The display indicates that a measurement is in progress and that the probe is functioning properly A measurement will take approximately two seconds.

When current has been applied to the probe, the system takes continuous measurements of the voltage developed across the probe. The voltage generated across the probe is inversely proportional to the level of fluid in contact with the probe. The probe supplies over 2 W of energy to the medium surrounding the probe. The system measures the dissipation of that energy into the medium surrounding the probe as a change in voltage of the probe. The lower the fluid level, the slower energy is dissipated, and the faster the rise of the voltage generated across the probe.

After about one second, enough probe voltage versus time measurements have been taken to make a determination of fluid level and the probe current is shut off. The probe voltage data is then analyzed to determine the change in voltage of the probe. The low probe voltage will be approximately nominal resistance of the probe times 400 mA and is found from the measured data. The high probe voltage is given by the last reading taken from the probe. Using the difference in voltage readings generated by the probe tends to neglect any effect of the temperature of the fluid whose level is being measured. The slope of the probe voltage versus time data is determined to be increasing. The voltage difference returned is compared to a table in ROM and turned into a location of the fluid level along the length of the probe. The configuration switches were checked for acceptable values as part of the self test and their values are now used to convert the fluid level along the length of the probe to a fluid level for the particular container.

To verify a correct indication of fluid level is being given, the result of the measurement is stored and the measurement process is repeated. If the second measurement is out of tolerance with the first measurement, the first measurement is discarded, and second measurement is stored, and a third measurement is taken. The process repeats ten times, or until it has determined the fluid level. If the measurement process fails, the fault indicator is lit. If a valid measurement is taken, the fluid level is displayed. Valid measurement or not, after several seconds the system turns itself off.

Figure 21:
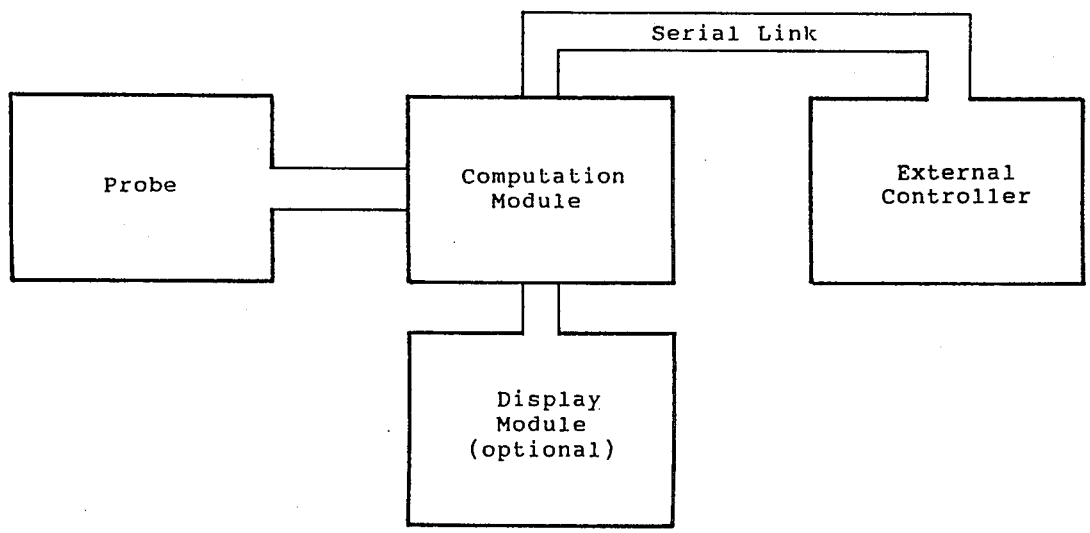
FIG. 21 is a block diagram of another embodiment of the liquid level measuring system of this invention.

Referring to FIG. 21, a third embodiment of the invention is shown. In this embodiment, the computation module receives commands and configuration information from an external controller and provides output to the external controller. The display module is optional in this configuration, but if connected, provides an operator with a viewable indication of the fluid level. The external controller could be any device supporting an asynchronous serial port. Such ports are quite common and are provided on a variety of industrial process controller and automotive engine control systems.

It should be apparent to those skilled in the art that what has been described are considered at present to be the preferred embodiments of the liquid level measuring system of this invention, in accordance with the patent statutes, changes may be made in the liquid level measuring systems without actually departing from the true spirit and scope of this invention.

The appended claims are intended to cover all such changes and modifications which fall in the true spirit and scope of this invention.

I claim:

1. A system for measuring the level of a liquid in a container,
    a liquid level probe having,
        an insulating support member,
        a positive temperature coefficient conductor mounted on said insulating support member, and extending into the liquid, such that the portion of said positive temperature coefficient conductor immersed in the liquid is dependent on the level of the liquid in the container,
    a microprocessor for receiving an input signal from said liquid level probe,
    a display means for receiving an output signal from said microprocessor and displaying an indication of the liquid level as determined by said liquid level probe,
    a main power supply circuit energized by an unregulated power source, which provides a regulated power output,
    a constant current power supply circuit energized by said main power supply circuit for supplying a constant current to the positive temperature coefficient conductor, whereby the supply of current to said positive temperature coefficient conductor causes the voltage across said conductor to rise, the voltage rising at a rate which is dependent on the level of the liquid in the container, the rate of change of said voltage appearing across said conductor being processed by said microprocessor to supply a digital signal indicative of said liquid level to said display means which in response thereto provides a display indicative of the liquid level in the container.

2. The system for measuring the level of a liquid of claim 1, wherein means are provided for mounting said conductor on said insulating support member such that the fluid will not adhere to said conductor.

3. The system for measuring the level of a liquid of claim 1, adapted for use in measuring the level of oil in an internal combustion engine oil pan, wherein the insulating support member is supported by the engine oil dip stick.

4. The system for measuring the level of a liquid of claim 3, wherein said display means is mounted on the exposed end of the dip stick.

5. The system for measuring the level of a liquid of claim 1, wherein said main power supply is energized from a battery.

6. The system for measuring the level of a liquid of claim 1, having a measurement initiation circuit, comprising,
    a manually operated momentary start switch,
    a means for maintaining the energization of the system for a predetermined time after actuation of said start switch, which predetermined time is adequate for the voltage on said conductor to stabilize, and said display means to provide an indication of the liquid level.

7. The system for measuring the level of a liquid of claim 6, wherein said measurement initiation circuit includes means for delaying the application of the constant current to said conductor, until the output of said main power supply has stabilized at the regulated output level.

8. The system for measuring the level of a liquid of claim 1, wherein at least two liquid level probes are provided, each of Which are mounted in separate containers, and said display means is provided with selections means, wherein one of said liquid level probes can be selected for energization, such that said display means will provide an indication of the liquid level in the container of said selected probe.

9. The system for measuring the level of a liquid of claim 1, wherein the output signal from said microprocessor is applied to a synchronous receiver transmitter which provides a serial bit stream output which is indicative of the liquid level.

10. The system for measuring the level of a liquid of claim 1, including a analog to digital converter, whereby the voltage appearing across said conductor is applied as an analog signal to said converter, and the digital output of said converter is applied as an input signal to said microprocessor.

11. The system for measuring the level of a liquid of claim 1, wherein said conductor is formed of wire which is 37 gauge or smaller and has a resistance which varies between 5 and 25 ohms per linear foot.

12. The system for measuring the level of a liquid of claim 1, including a non-volatile memory circuit and a volatile memory circuit, said non-volatile memory circuit providing a program to said microprocessor for causing said microprocessor to provide a digital signal output indicative of the liquid level to said display means, said volatile memory storing signals being processed by said microprocessor.

13. The system for measuring the level of a liquid of claim 1, including manually operated selection means providing a calibration function whereby the digital output signals of said microprocessor are indicative of the liquid level in the container.

14. The system for measuring the level of a liquid of claim 1, wherein said constant current power supply circuit comprises an operational amplifier, a potentiometer, and a transistor, said potentiometer providing one of the input signals to said operational amplifier, and the output of said operational amplifier controlling the collector - emitter current of said transistor to provide a constant current to the positive temperature coefficient conductor.

15. The system for measuring the level of a liquid of claim 1, wherein said constant current power supply circuit comprises an operational amplifier, a digital to analog converter, and a transistor, said microprocessor providing a signal to said digital to analog converter, and said digital to analog converter providing one of the input signals to said operational amplifier, and the output of said operational amplifier controlling the collector - emitter current of said transistor to provide a constant current to the positive temperature coefficient conductor.

16. A system for determining fluid level of liquid in a container comprising,
 a liquid level probe to interact with the fluid whose level is being measured having an insulating support member, a positive temperature coefficient conductor mounted on said insulating support member and extending into the liquid such that the portion of said positive temperature coefficient conductor immersed in liquid is dependent on the level of the liquid in the container,
 a microprocessor for receiving an input signal from said liquid level probe,
 a display means for receiving an output signal from said microprocessor and displaying an indication of the liquid level as determined by said liquid level probe,
 a main power supply circuit energized by an unregulated power source which provides regulated and unregulated power,
 a constant current power circuit energized by said unregulated power for supplying a constant current to the positive temperature coefficient conductor, whereby the supply of current to said positive temperature coefficient conductor causes the voltage appearing across said conductor to rise, the voltage rising at a rate which is dependent on the level of the liquid in the container, the rate of change of said voltage being processed by said microprocessor to supply a digital signal indicative of said liquid level to said display means which in response thereto provides a display indicative of the liquid level in the container.

17. The system for determining fluid level of a liquid of claim 14, wherein the output signal from said microprocessor is applied to an asynchronous receiver/transmitter which provides a serial bit stream output which is indicative of the liquid level.

18. The system for determining fluid level of a liquid of claim 14, including an analog to digital converter, whereby the voltage appearing across said conductor is applied as an analog signal to said converter, and the digital output of said converter is applied as an input signal to said microprocessor.

19. The system for determining fluid level of a liquid of claim 14, including a non-volatile memory circuit and a volatile memory circuit, said non-volatile memory circuit providing a program to said microprocessor for causing said microprocessor to provide a digital signal output indicative of the liquid level to said display means, said volatile memory storing signals being processed by said microprocessor.

20. The system for determining the level of a liquid of claim 17, including an analog to digital converter, the voltage appearing across said probe being applied as an analog signal to said analog to digital converter, and the digital output of said analog to digital converter being applied as an input signal to said microprocessor.

21. The system for determining the level of a liquid of claim 19, wherein said analog to digital converter circuit is of ratiometric design such that the range of non-zero values output by the converter corresponds to the range of voltages provided by said probe when said constant current is applied to it.

22. The system for determining the level of a liquid of claim 19, wherein said microprocessor, which receives commands from a control program stored in said non-volatile memory, receives voltages generated by said probe from said analog to digital converter, stores data read from said analog to digital converter in said volatile memory, analyzes data in said volatile memory to calculate fluid level, controls supply of unregulated power, and provides status and fluid level data to an asynchronous receiver/transmitter which provides a serial bit stream output to said display means.

23. The system for determining the level of liquid of claim 21 wherein the serial bit stream provided by said asynchronous receiver/transmitter is provided to another computer or controller such as those found in later model automobiles or in industrial automated controls.

24. The system for determining the level of a liquid of claim 14, including a computation unit which applies said constant current to said positive temperature coefficient conductor, the application of said constant current causes the voltage appearing across said conductor to rise, the voltage rising at a rate which is dependent on the level of liquid in the container, the voltage being repetitively measured for a predetermined time during the application of the constant current, the voltage being measured by said microprocessor which provides to the display means a signal indicative of the fluid level in the container.

25. The system for determining the level of a liquid of claim 14, wherein said power supply is energized from a dry cell battery.

26. The system for determining the level of a liquid of claim 14, having a measurement initiation circuit, comprising, a manually operated momentary start switch,
 a means for maintaining the energization of the system for a predetermined time after actuation of said start switch,
 a means for terminating the unregulated power at a predetermined time period after a determination of the liquid level is placed on the display.

27. The system for determining the level of a liquid of claim 14, adapted for use in measuring the level of oil, in an internal combustion engine oil pan, wherein the insulating support member is supported by the engine oil drain plug.

28. The system for determining the level of a liquid of claim 25, wherein said display means is mounted on the exposed end of the dip stick.

29. The system for determining fluid level of a liquid of claim 14, wherein at least two liquid level determination probes are provided, each of which are mounted in separate containers, and said display means is provided with selection means, wherein one of said liquid level determination probes can be selected for energization, such that said readout display means will provide an indication of the liquid level in the container of said selected probe.

30. The system for determining fluid level of a liquid of claim 14, wherein said conductor is formed of wire which is 37 gauge or smaller and has a resistance of between 5 and 25 ohms per linear foot at room temperature.

31. The system for determining the level of a liquid of claim 14, wherein means are provided for mounting said conductor on said insulating support member such that the fluid will not adhere to said conductor.

32. The system for determining the level of a liquid of claim 14, adapted for use in measuring the level of oil in, an internal combustion engine oil pan, wherein the insulating support member is supported by the engine oil dip stick.

33. The system for determining fluid level of a liquid of claim 14, include manually operated selection means providing a calibration function whereby the operating range of fluid level can be configured to a specified section of probe length, such that a "full" indication will be given when fluid level is at or above the upper end of the specified section and an "empty" indication will be given when the fluid level falls below the lower end of the specified section of the probe.

34. The system for determining fluid level of a liquid of claim 14, wherein a means is provided for comparing an existing dip stick to a comparison card, which said comparison card has measured spaced increments that correlate to microprocessors switches used for calibrating the liquid level probe.

35. The system for measuring the level of a liquid of claim 14, wherein said constant current power supply circuit comprises an operational amplifier, a potentiometer, and a transistor, said potentiometer providing one of the input signals to said operational amplifier, and the output of said operational amplifier controlling the collector - emitter current of said transistor to provide a constant current to the positive temperature coefficient conductor.

36. The system for measuring the level of a liquid of claim 14, wherein said constant current power supply circuit comprises an operational amplifier, a digital to analog converter, and a transistor, said microprocessor providing a signal to said digital to analog converter, and said digital to analog converter providing one of the input signals to said operational amplifier, and the output of said operational amplifier controlling the collector - emitter current of said transistor to provide a constant current to the positive temperature coefficient conductor.

* * * * *